United States Patent
Tachikawa et al.

[11] 3,755,300
[45] Aug. 28, 1973

[54] PROCESS FOR THE PREPARATION OF BENZODIAZEPINE COMPOUNDS

[75] Inventors: Ryuji Tachikawa; Hiromu Takagi; Tetsuo Miyadera; Toshiharu Kamioka; Mitsunobu Fukunaga; Yoichi Kawano, all of Tokyo, Japan

[73] Assignee: Sankyo Company Limited

[22] Filed: Oct. 22, 1969

[21] Appl. No.: 13,919

[30] Foreign Application Priority Data
Oct. 24, 1968   Japan.............................. 43/77500
Oct. 24, 1968   Japan.............................. 43/77504
Apr. 17, 1969   Japan.............................. 44/29968

[52] U.S. Cl. ... 260/239.3 T, 260/243 R, 260/244 R, 260/256.4 F, 260/307 R, 260/306.7, 260/566 R, 260/562 N, 260/295 Q, 260/287 R, 424/270, 424/272, 424/246, 424/248, 260/293.76, 260/247.2 A, 260/326.3, 260/268 R

[51] Int. Cl. C07d 87/54, C07d 91/42, C07d 85/48, C07d 93/01, C07d 93/08, C07d 51/46, C07d 53/06, C07d 27/30

[58] Field of Search ................. 260/239.3 T, 243 R 260/244 R, 256.4 F, 307 R, 306.7

Primary Examiner—Henry R. Jiles
Assistant Examiner—Robert T. Bond
Attorney—Toren and McGeady

[57] ABSTRACT

A process for the preparation of a benzodiazepine compound having the formula

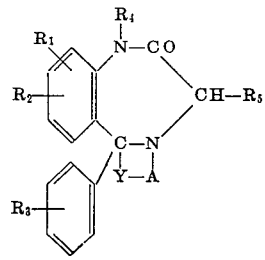

wherein
$R_1$, $R_2$ and $R_3$ may be the same or different and each represents
hydrogen atom,
a lower alkyl group,
a lower alkoxy group,
a halogen atom,
hydroxy group,
nitro group,
cyano group,
an acyl group,
trifluoromethyl group,
amino group,
an acylamino group,
a N-mono(lower alkyl)amino group,
a N-di(lower alkyl)amino group,
an acyloxy group,
carboxyl group,
an alkoxycarbonyl group,
carbamoyl group,
a N-mono(lower alkyl)carbamoyl group,
a N-di(lower alkyl)carbamoyl group,
a lower alkylthio group,
a lower alkylsulfinyl group or
a lower alkylsulfonyl group;
$R_4$ represents
hydrogen atom,
a lower alkyl group,
a cycloalkyl group,
an aralkyl group,
an aryl group or
phenacyl group;
$R_5$ represents
hydrogen atom or
a lower alkyl group;
A represents
an alkylene group which may be straight or branched; and
Y represents
oxygen atom or sulfur atom which comprises reacting a compound having the formula

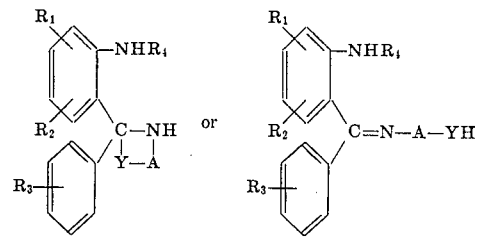

wherein $R_1$, $R_2$, $R_3$, $R_4$, Y and A are as defined above or a mixture of these compounds with a reactive derivative of a compound having the formula

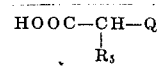

wherein Q represents an acid radical of a reactive ester and $R_5$ is as defined above.

The benzodiazepine compounds are useful as a minor tranquilizer.

4 Claims, No Drawings

PROCESS FOR THE PREPARATION OF BENZODIAZEPINE COMPOUNDS

RELATED APPLICATION

This application is related to application Ser. No. 775,914, filed Nov. 14, 1968 of Ryuji Tachikawa et al., entitled "Benzodiazepine Derivatives and Process for Preparing the Same."

This invention relates to a novel process for the preparation of novel benzodiazepine compounds. More particularly, it relates to a novel process for preparing a novel benzodiazepine compound having the formula

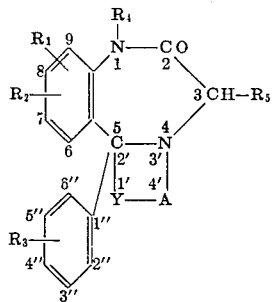

(I)

wherein
$R_1$, $R_2$ and $R_3$ may be the same or different and each represents
hydrogen atom,
a lower alkyl group,
a lower alkoxy group,
a halogen atom,
hydroxy group,
nitro group,
cyano group,
an acyl group,
trifluoromethyl group,
amino group,
an acylamino group,
a N-mono(lower alkyl)amino group,
a N-di(lower alkyl)amino group,
an acyloxy group,
carboxyl group,
an alkoxycarbonyl group,
carbamoyl group,
a N-mono(lower alkyl)carbamoyl group,
a N-di(lower alkyl)carbamoyl group,
a lower alkylthiogroup,
a lower alkylsulfinyl group or
a lower alkylsulfonyl group;
$R_4$ represents
hydrogen atom,
a lower alkyl group,
a cycloalkyl group,
an aralkyl group,
an aryl group or
phenacyl group.
$R_5$ represents
hydrogen atom or
a lower alkyl group;
A represents an alkylene group which may be straight or branched; and
Y represents oxygen atom or sulfur atom.

In the above formula (I), $R_1$, $R_2$ and $R_3$ may occupy any position of the benzene ring and $n'$ shows the position number of carbon atom in the alkylene radical A; for example, $n'$ means 4' and 5' for ethylene.

In the above formula (I), the lower alkyl group can be straight or branched alkyl group, such as methyl, ethyl, n-propyl, isopropyl, n-butyl, sec.-butyl, tert.-butyl and the like. The lower alkoxy group can be, for example, methoxy, ethoxy, propoxy, isopropoxy, butoxy and the like. The halogen atom can be fluorine, chlorine, bromine or iodine. The acyl group can be aliphatic and aromatic acyl group such as formyl, acetyl, propionyl, butyryl, benzoyl, toluoyl, napththoyl and the like. The acylamino group can be, for example, acetylamino, propionylamino, butyrylamino, benzoylamino, toluoylamino, naphthoylamino and the like. The N-mono(lower alkyl)-amino group can be, for example N-methyl, -ethyl, -propyl or -butylamino group. The N-di(lower alkyl)amino group can be, for example, N-dimethyl, -diethyl, -dipropyl or dibutylamino group. The acyloxy group can be, for example, acetoxy, propionyloxy, butyryloxy, benzoyloxy and the like. The alkoxycarbonyl group can be, for example, methoxycarbonyl, ethoxycarbonyl, propoxycarbonyl, butoxycarbonyl and the like. The N-mono(lower alkyl)carbamoyl group can be, for example, N-methyl, -ethyl, -propyl or -butylcarbamoyl. The N-di(lower alkyl)carbamoyl group can be, for example, N-dimethyl, -diethyl, -dipropyl or-dibutylcarbamoyl. The lower alkylthio group can be, for example, methylthio, ethylthio, propylthio, butylthio and the like. The lower alkylsulfinyl group can be, for example, methylsulfinyl, ethylsulfinyl, propylsulfinyl, butylsulfinyl and the like. The lower alkylsulfonyl group can be, for example, methylsulfonyl, ethylsulfonyl, propylsulfonyl, butylsulfonyl and the like. The cycloalkyl group can be, for example, cyclopropyl, cyclopentyl, cyclohexyl and the like. The aralkyl group can be, for example, benzyl, phenethyl and the like. The aryl group can be, for example, phenyl, naphthyl and the like. The alkylene group can be, for example, ethylene, propylene, trimethylene, 1,2-butylene, 1,3-butylene, 2,3-butylene, tetramethylene and the like.

The benzodiazepine compounds of the above formula (I) are all novel compounds unknown in the prior art. They have high psychosedative activity. More particularly, they exert both tranquilizing and antidepressant activities on the central nervous system and produce calmness and relaxation. In addition to such favourable psycholeptic properties, the benzodiazepine compounds of this invention have an extremely low toxicity to man and less tendency to produce side effects.

Thus, the benzodiazepine compounds of this invention are useful as a minor tranquilizer in the relief of various psychoneurotic depressions.

These active compounds may be employed for the treatment of psychoneurotic disorders in the form of a pharmaceutical preparation which comprises the benzodiazepine compound (I) and a pharmaceutically acceptable carrier.

The pharmaceutical preparation may be in the form of oral preparations including tablets, capsules, powders, oral suspensions and syrups, or parenteral preparations including injectable solutions and suspensions. In making up these preparations, there may be employed any of pharmaceutically acceptable carriers commonly used in the art. Example of such carriers are pharmaceutical vehicle, binder or filler such as water, starch, gelatin, lactose, talc, cellulosic material, magnesium stearate, vegetable oils, gum and any other known material. These pharmaceutical preparations may, if desired, contain various kinds and types of auxiliary agents, such as preserving agents, stabilizing agents, emulsifying agents, buffers or salts for adjusting osmotic pressure and they may be also sterilized in a conventional manner.

The amount to be administered for the treatment of psychoneurotic disorders, that is, the dosage of the active benzodiazepine compound (I) should be determined by skilled physicians taking consideration of the ages and weight of patients, kinds and severities of disorders, possible side effects and other factors, but there is usually employed the total daily dosage for adults of about 5 to 100 mg., preferably in multiple doses such as three or more times a day, while larger total daily dosages may be effectively employed in some cases. Moreover, the active benzodiazepine compound (I) of this invention may be continuously and satisfactorily administered to man for a long period of time, for example, about 2 to 3 weeks, based upon the severities of disorders.

Therefore, it is an object of this invention to provide a novel process for preparing the benzodiazepine compounds (I) which are valuable minor tranquilizing drugs. According to this invention, the benzodiazepine compound of the above formula (I) can be prepared by a process which comprises reacting a compound having the formula (II) or (II)'

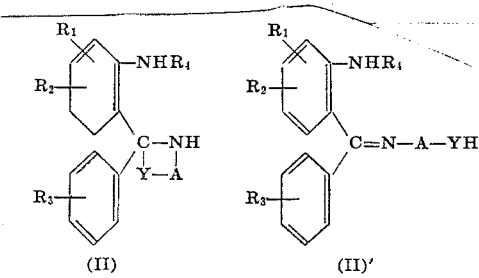

wherein $R_1$, $R_2$, $R_3$, $R_4$, A and Y are as defined above or a mixture of these compounds with a reactive derivative of carboxylic acid having the formula

(III)

wherein $R_5$ is as defined above and Q is an acid radical of a reactive ester. In the above formula (III), the group Q, i.e. "an acid radical of a reactive ester" means to include an acid radical of such esters as hydrohalogenic acid esters, sulfonic acid esters and phosphoric acid esters; representatives of such acid radicals being chlorine, bromine, iodine, p-toluenesulfonyloxy group, methansulfonyloxy group, diphenylphosphoryl group and the like. As the reactive derivatives of carboxylic acid having the formula (III), there may be employed an acid halide, an acid anhydride and the like, all of which are derived from the carboxylic acid (III).

In carrying out the process of this invention, the reaction may be preferably conducted in the presence of an acid binding agent and an inert organic solvent. As the inert solvent, there may be satisfactorily employed any organic solvent that would not adversely affect the reaction in the process of this invention.

Representative examples of these inert organic solvents include an aromatic hydrocarbon such as benzene, toluene or xylene; a cyclic ether such as dioxane or tetrahydrofuran; an ester of an organic acid such as ethyl acetate, amyl acetate or butyl acetate; a halogenated hydrocarbon such as chloroform, dichloroethane or carbon tetrachloride; acetonitrile; dimethylformamide; dimethylsulfoxide; and the like.

The reaction in the process of this invention, as is explained hereinabove, may be preferably conducted in the presence of an acid water to the reaction mixture, extraction of the mixture with benzene, toluene or ether, drying the extract and subsequent removal of the extraction solvent and, if desired, the crude product thus obtained may be purified by a conventional means, e.g., recrystallization or chromatographic technique. In the reaction of the process of this invention, when an aliphatic, aromatic or heterocyclic tertiary amine is employed as the acid binding agent, a quaternary ammonium salt having the formula (IV) or (IV)'

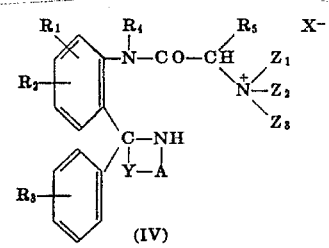

(IV)

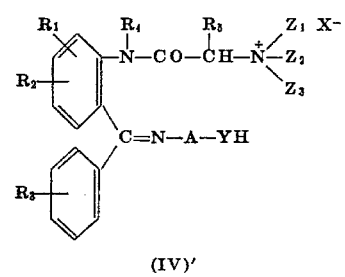

(IV)' wherein

represents a quaternary ammonium ion and X⁻ represents an anion and $R_1$, $R_2$, $R_3$, $R_4$, $R_5$, A and Y are as defined above is obtained as by-product. The quaternary ammonium salts having the formulae (IV) and (IV)' are tautomers. Examples of the quaternary ammonium ion which is represented by

in the formulae (IV) and (IV)' include the following aliphatic, aromatic or heterocyclic quaternary ammonium ions;

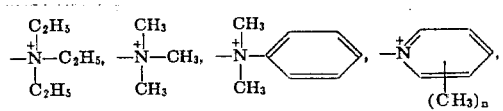

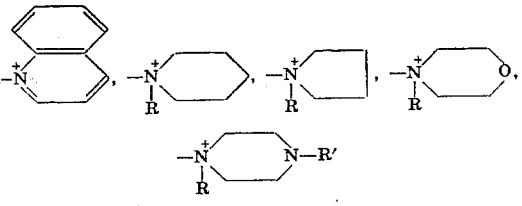

In the above formula, R represents a lower alkyl group, R' represents hydrogen atom or a lower alkyl group and n is an integer from 0 to 3.

Examples of the anion which is represented by X⁻ include an inorganic anion such as chloride-, bromide- or sulfate-ion or an organic anion such as acetate-, picrate-, benzoate- or p-toluene-sulfonate-ion. The quaternary ammonium salts having the formula (IV) or (IV)' are obtained in large quantities when the reaction is carried out at a lower temperature and in the presence of an excess amount of an aliphatic, aromatic or heterocyclic tertiary amine. The quaternary ammonium salts having the formula (IV) or (IV)' are sparingly soluble in water, benzene, toluene and ether so that they can be isolated as the insolubles in the above-mentioned extraction procedure and purified by recrystallization from a suitable organic solvent such as ethanol.

The quaternary ammonium salts are easily converted to the benzodiazepine compounds (I) by heating in the absence or presence of a solvent. When the reaction is carried out in the absence of a solvent, crystals of the quaternary ammonium salts (IV) or (IV)' are heated at a temperature in the neighborhood of the melting decomposition point thereof. When the reaction is carried out in the presence of a solvent, there may be satisfactorily employed any of organic solvents that would not adversely affect the reaction and in which the starting material employed would be soluble. Preferably a high boiling solvent such as p-cymene, dimethylformamide or dimethylsulfoxide is employed.

The quaternary ammonium salts (IV) or (IV)' dissolved in an above-mentioned solvent are heated under atmospheric pressure or under pressure nearly at a temperature of melting (decomposition) point thereof. The heating period may be varied depending upon the kind and type of the starting materials employed. After completion of the reaction, the desired product (I) may be easily recovered from the reaction mixture by a conventional means. For instance, when the solvent is employed, the solvent is distilled off from the reaction mixture. The reaction mixture which is obtained by conducting the reaction in the absence of the solvent is extracted with dichloromethane or chloroform. The extract is dried and the solvent is distilled off. The residue is recrystallized from a suitable solvent such as ethanol, or if desired, silica gel chromatographic treatment is applied before the recrystallization.

The compounds having the formula (II) and (II)' employed as starting materials in the present invention are tautomers and exist as the structure represented by the formula (II) or (II)' or in equilibrium state thereof in various proportions, depending upon the kind of the substituents, e.g., $R_1$, $R_2$, $R_3$, $R_4$, Y and A and the condition wherein the compound is present, e.g., temperature or solvent. Almost all the compounds (II) are oily substances. The oily substance is converted to the crystalline substance of the compound (II)' by standing or treatment with an organic solvent. The crystalline substance thus obtained can be converted to an oily substance substantially containing the compound (II) by vacuum distillation.

The compound having the formula (II) or (II)' or the mixture thereof can be prepared by reacting an aminobenzophenone derivative having the formula

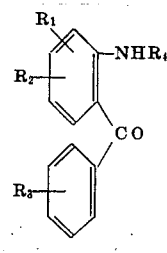

(V)

wherein $R_1$, $R_2$, $R_3$ and $R_4$ are as defined above with an amine compound having the formula

H—Y—A—NH₂

(VI)

wherein Y and A are as defined above.

In carrying out said reaction, for example, the aminobenzophenone derivative (V) is admixed with an excess of an equimolar amount of the amine compound (VI). The mixture is heated under azeotropic separation of water to remove water formed in the reaction. The reaction mixture is further distilled under reduced pressure to obtain an oily residue predominantly containing the compound (II). The oily residue can be employed as the starting material in this invention without further treatment as described hereinbelow. The oily substance substantially containing the compound (II) can be obtained by vacuum distillation of said oily residue. When the oily substance is left or crystallized from an organic solvent, the crystalline substance having the formula (II)' is obtained.

The following examples illustrate the process for preparing the compounds (II) and (II)' which are employed in the present invention as starting materials.

Preparation of a starting material
2-(5-Chloro-2-aminophenyl)-2-phenyl-5-methyloxazolidine A mixture of 11.8 g of 5-chloro-2-aminobenzophenone and 12.0 g of isopropanolamine was heated at 170°~180° C for 4 hours. After cooling, the excess isopropanolamine was distilled off under reduced pressure and the residue was distilled in vacuo to give the oily material, which was substantially composed of 2-(5-chloro-2-amino-phenyl)-2-phenyl-5-methyloxazolidine, boiling at 159°~162°C/5.0 × 10⁻⁴ mmHg.

Analysis:
Calculated for $C_{16}H_{17}ON_2Cl$;
C, 66.54; H, 5.93; N, 9.70; Cl, 12.28.
Found: C, 66.70; H, 5.93; N, 9.52; Cl, 12.56

Following the substantially same procedure as described above, the following oxazolidine derivatives were similarly prepared from the corresponding benzophenones and amines:

2-(3,5-dimethyl-2-aminophenyl)-2-phenyl-5-methyloxazolidine (b.p. 164°~170°C/2.0 × 10⁻³ mmHg);

2-(5-chloro-2-aminophenyl)-2-phenyloxazolidine (b.p. 191°~194°C/8.0 × 10⁻⁴ mmHg);

2-(5-bromo-2-aminophenyl)-2-phenyl-5-methyloxazolidine (b.p. 179°~182°C/8.1 ×10⁻⁴ mmHg);

2-(5-bromo-2-aminophenyl)-2-(2-chlorophenyl)-5-methyloxazolidine (b.p. 189°~193°C/8.0 × 10⁻⁴ mmHg);

2-(5-chloro-2-aminophenyl)-2-(2-chlorophenyl)oxazolidine (b.p. 193°~194°C/6.0 × 10⁻⁴ mmHg);

2-(5-chloro-2-aminophenyl)-2-(2-chlorophenyl)-5-methyloxazolidine (b.p. 183°184°C/4.4 × 10⁻⁴ mmHg);

2-(3,5-dimethyl-2-aminophenyl)-2-phenyloxazolidine (b.p. 174°~177°C/1.0 × 10⁻⁴ mmHg);

2-[2-Amino-5-chloro-α-(2-chlorophenyl)benzylideneamino]ethanol

A mixture of 10.6 g of 5-chloro-2-amino-o-chlorobenzophenone and 9.8 g of 2-aminoethanol was heated at 170°~180°C for 5 hours. After cooling, the excess 2-aminoethanol was distilled off under reduced pressure and the residue was recrystallized from benzene to give the desired product as crystals melting at 121°~123°C.

Following the substantially same procedure as described above, various benzylideneaminoethanol derivatives included in the above formula (II)' were similarly prepared from the corresponding benzophenones and amines.

The following examples are given for the purpose of illustrating of this invention. It is to be understood that these examples should not be construed as limiting the scope of this invention.

Example 1

7-Chloro-5-phenyl-[5,4-b]-5'-methyloxazolidino-2,3,4,5-tetrahydro-1H-1,4-benzodiazepin -2-one To 16 g of 2-(5-chloro-2-aminophenyl)-2-phenyl-5-methyloxazolidine dissolved in 180 ml of dioxane, 8.0 g of pyridine was added and the resulting mixture was cooled in an ice-water bath with stirring. To the resulting solution was added 12.2 g of bromoacetyl bromide drop by drop. The temperature of the reaction mixture was kept below 20°C during the addition of the reagent. The mixture was stirred at room temperature for an additional 3 hours. At the end of this time 200 ml of toluene and 200 ml of water were added and then the mixture was shaken. The organic layer was separated from aqueous layer, dried over anhydrous sodium sulfate and then the solvent was distilled off. The residue was recrystallized from ethanol to give the desired product melting at 186.5°~188°C.

Example 2

7-Chloro-5-phenyl-[5,4-b]-oxazolidino-2,3,4,5-tetrahydro-1H-1,4-benzodiazepin -2-one Following the procedure similar to that described in Example 1, but substituting 2-(5-chloro-2-aminophenyl)-2-phenyloxazolidine and triethylamine for 2-(5-chloro-2-aminophenyl)-2-phenyl-5-methyloxazolidine and pyridine, the desired product melting at 175°~176°C was obtained.

Example 3

7,9-Dimethyl-5-phenyl-[5,4-b]-5'-methyloxazolidino-2,3,4,5-tetrahydro -1H-1,4-benzodiazepin -2-one Following the procedure similar to that described in Example 1, but substituting 2-(3,5-dimethyl-2-aminophenyl)-2-phenyl-5-methyl-oxazolidine and bromoacetic anhydride for 2-(5-chloro-2-aminophenyl)-2-phenyl-5-methyloxazolidine and bromoacetyl bromide, the desired product melting at 272°~273°C was obtained.

Example 4

7-Bromo-5-phenyl-[5,4-b]-5'-methyloxazolidino-2,3,4,5-tetrahydro-1H-1,4-benzodiazepin -2-one Following the procedure similar to that described in Example 1, but substituting 2-(5-bromo-2-aminophenyl)-2-phenyl-5-methyloxazolidine and sodium carbonate for 2-(5-chloro-2-aminophenyl)-2-phenyl-5-methyloxazolidine and pyridine, the desired product melting at 180.5°~182°C was obtained.

Example 5

7-Bromo-5-(2''-chlorophenyl)-[5,4-b]-5'-methyloxazolidino-2,3,4,5-tetrahydro-1H-1,4-benzodiazepin -2-one Following the procedure similar to that described in Example 1, but substituting 2-(5-bromo-2-aminophenyl)-2-(2-chlorophenyl)-5-methyloxazolidine for 2-(5-chloro-2-aminophenyl)-2-phenyl-5-methyl-oxazolidine, the desired product melting at 196°~198°C was obtained.

Example 6

7-Chloro-5-(2''-chlorophenyl)-[5,4-b]-oxazolidino-2,3,4,5-tetrahydro-1H-1,4-benzodiazepin -2-one Following the procedure similar to that described in Example 1, but substituting 2-(5-chloro-2-aminophenyl)-2-(2-chlorophenyl)-oxazolidine for 2-(5-chloro-2-aminophenyl)-2-phenyl-5-methyloxazolidine, the desired product melting at 201°~204°C with decomposition was obtained.

Example 7

7-Chloro-5-(2''-chlorophenyl)-[5,4-b]-5'-methyloxazolidino-2,3,4,5-tetrahydro-1H-1,4-benzodiazepin-2-one Following the procedure similar to that described in Example 1, but substituting 2-(5-chloro-2-aminophenyl)-2-(2-chlorophenyl)-5-methyloxazolidine for 2-(5-chloro-2-aminophenyl)-2-phenyl-5-methyloxazolidine, the desired product melting at 190°~192°C was obtained.

Example 8

3,7,9-Trimethyl-5-phenyl-[5,4-b]-oxazolidino-2,3,4,5-tetrahydro-1H-1,4-benzodiazepin -2-one Following the procedure similar to that described in Example 1, but substituting 2-(3,5-dimethyl-2-aminophenyl)-2-phenyloxazolidine and α-bromopropionyl chloride for 2-(5-chloro-2-aminophenyl)-2-phenyl-5-methyloxazolidine and bromoacetyl bromide, the desired product melting at 218°~221°C was obtained.

Example 9

7-Chloro-5-phenyl-[5,4-b]-5'-methyloxazolidino-2,3,4,5-tetrahydro-1H-1,4-benzodiazepin -2-one To a solution of 5.8 g of 2-(2-amino-5-chloro-α-phenylbenzylidene-amino)-1-methylethanol in 80 ml of dioxane was added 3.8 g of pyridine. The reaction mixture was stirred and the reaction bottle was cooled in an ice-water bath. Four point five grams of bromoacetyl bromide was then added dropwise to the mixture. During the addition of the reagent, the temperature of the reaction mixture was kept below 15°C. Then the stirring was continued at room temperature for 3 hours. After completion of the reaction, the reaction mixture was poured into ice-water and extracted with dichloromethane. The extract was washed with water, dried over anhydrous sodium sulfate and then the solvent was distilled off. The residue was recrystallized from ethanol to give the desired product melting at 186°~188°C.

Example 10

7,9-Dimethyl-5-phenyl-[5,4-b]-5,'-methyloxazolidino-2,3,4,5-tetrahydro-1H-1,4-benzodiazepin -2-one Following the procedure similar to that described in Example 9, but substituting 2-(2-amino-3,5-dimethyl-α-phenylbenzylideneamino)-1-methylethanol and bromacetyl chloride for 2-(2-amino-5-chloro-α-phenylbenzylideneamino)-1-methylethanol and bromoacetyl bromide, the desired product melting at 272°~273°C with decomposition was obtained.

Example 11

7-Chloro-5-(2''-chlorophenyl)-[5,4,-b]-oxazolidino-2,3,4,5-tetrahydro-1H-1,4-benzodiazepin -2-one To a solution of 5.6 g of 2-[2-amino-5-chloro-α-(2-chlorophenyl) benzylideneamino]ethanol in 80 ml of dioxane was added 2.3 g of sodium carbonate. The reaction mixture was stirred and the reaction bottle was cooled in an ice-water bath. Eight point one grams of bromacetyl bromide was then added dropwise to the mixture. During the addition of the reagent, the temperature of the reaction mixture was kept below 15°C. The stirring was continued further at room temperature for 3 hours. After completion of the reaction, the reaction mixture was poured into ice-water and extracted with dichloromethane. The extract was washed with water, dried over anhydrous sodium sulfate and then the solvent was distilled off. The residue was recrystallized from ethanol to give the desired product as crystals melting at 204°C with decomposition.

Example 12

7-Chloro-5-phenyl-[5,4-b]-thiazolidino-2,3,4,5-tetrahydro-1H-1,4-benzodiazepin -2-one Following the procedure similar to that described in Example 11, but substituting 2-(2-amino-5-chloro-α-phenylbenzylideneamino)ethyl mercaptan for 2-[2-amino-5-chloro-α-(2-chlorophenyl)benzylideneamino]ethanol, the desired product melting at 241°~243°C with decomposition was obtained.

Example 13

7-Chloro-9-methyl-5-phenyl-[5,4-b]-5'-methyloxazolidino-2,3,4,5-tetrahydro-1H-1,4-benzodiazepin -2-one Following the procedure similar to that described in Example 9, but substituting 2-(2-amino-3-methyl-5-chloro-α-phenylbenzylidene-amino)-1-methylethanol and triethylamine for 2-(2-amino-5-chloro-α-phenylbenzylideneamino)-1-methylethanol and pyridine, the desired product melting at 253~254°C with decomposition was obtained.

Example 14

7,8-Dichloro-5-phenyl-[5,4-b]-5'-methyloxazolidino-2,3,4,5-tetrahydro-1H-1,4-benzodiazepin-2-one Following the procedure similar to that described in Example 11, but substituting 2-(2-amino-4,5-dichloro-α-phenylbenzylideneamino)-1-methylethanol for 2-[2-amino-5-chloro-α-(2-chlorophenyl) benzylideneamino]ethanol, the desired product melting at 195°~197°C was obtained.

Example 15

7-Bromo-1-ethyl-5-phenyl-[5,4-b]-oxazolidino-2,3,4,5-tetrahydro-1H-1,4-benzodiazepin-2-one Following the procedure similar to that described in Example 11, but substituting 2-(2-ethylamino-5-bromo-α-phenylbenzylideneamino)ethanol and potassium carbonate for 2-[2-amino-5-chloro-α- (2-chlorophenyl)-benzylideneamino]ethanol and sodium carbonate, the desired product melting at 136 °~138°C was obtained.

Example 16

7-Chloro-5-phenyl-[5,4-b]-oxazolidino-2,3,4,5-tetrahydro-1H-1,4-benzodiazepin-2-one Following the procedure similar to that described in Example 11, but substituting 2-(2-amino-5-chloro-α-phenylbenzylideneamino) ethanol for 2-[2-amino-5-chloro-α-(2-chlorophenyl)benzylideneamino]ethanol, the desired product melting at 175°~176°C was obtained.

Example 17

7-Chloro-3-methyl-5-phenyl-[5,4-b]-oxazolidino-2,3,4,5-tetrahydro-1H-1,4-benzodiazepin-2-one Following the procedure similar to that described in Example 11, but substituting 2-(2-amino-5-chloro-α-phenylbenzylideneamino) ethanol and α-bromopropionyl chloride for 2-[2-amino-5-chloro-α-(2-chlorophenyl)benzylideneamino]ethanol and bromoacetyl bromide, the desired product melting at 205°~207°C was obtained.

Example 18

7-Chloro-5-o-tolyl-[5,4-b]-5'-methyloxazolidino-2,3,4,5-tetrahydro-1H-1,4-benzodiazepin-2-one Following the procedure similar to that described in Example 9, but substituting 2-[2-amino-5-chloro-α-(o-tolyl)benzylideneamino]-1-methylethanol and triethylamine for 2-(2-amino-5-chloro-α-phenylbenzylideneamino)-1-methylethanol and pyridine, the desired product melting at 205°C with decomposition was obtained.

Example 19

7-Chloro-5-(2-chlorophenyl)-[5,4-b]-5'-methyloxazolidino-2,3,4,5-tetrahydro-1H-1,4-benzodiazepin-2-one Following the procedure similar to that described in Example 11, but substituting 2-[2-amino-5-chloro-α-(2-chlorophenyl)benzylideneamino]-1-methylthanol and potassium carbonate for 2-[2-amino-5-chloro-α-(2-chlorophenyl)benzylideneamino]ethanol and sodium carbonate, the desired product melting at 192°C with decomposition was obtained.

Example 20

7-Chloro-1-methyl-5-phenyl-[5,4-b]-oxazolidino-2,3,4,5-tetrahydro-1H-1,4-benzodiazepin-2-one Following the procedure similar to that described in Example 11, but substituting 2-(2-methylamino-5-chloro-α-phenylbenzylideneamino)ethanol for 2-[2-amino-5-chloro-α-(2-chlorophenyl)benzylideneamino]ethanol, the desired product melting at 181°~183 °C was obtained.

Example 21

7-Bromo-5-(2''-chlorophenyl)-[5,4-b]-oxazolidino-2,3,4,5-tetrahydro-1H-1,4-benzodiazepin-2-one Following the procedure similar to that described in Example 11, but substituting 2-[2-amino-5-bromo-α-(2-chlorophenyl) benzylideneamino]ethanol and bromoacetyl chloride for 2-[2-amino-5-chloro-α-(2-chlorophenyl)-benzylideneamino]ethanol and bromoacetyl bromide, the desired product melting at 207°C with decomposition was obtained.

Example 22

7-Bromo-5-(2''-chlorophenyl)-[5,4-b]-5'-methyloxazolidino-2,3,4,5-tetrahydro-1H-1,4-benzodiazepin-2-one Following the procedure similar to that described in Example 11, but substituting 2-[2-amino-5-bromo-α-(2-chlorophenyl) benzylideneamino]-1-methylethanol for 2-[2-amino-5-chloro-α-(2-chlorophenyl)benzylideneamino]ethanol, the desired product melting at 196°~197°C with decomposition was obtained.

Example 23

7-Chloro-5-phenyl-[5,4-b]-tetrahydro-2H-1',3'-oxazino-2,3,4,5-tetrahydro-1H-1,4-benzodiazepin-2-one Following the procedure similar to that described in Example 11, but substituting 3-(2-amino-5-chloro-α-phenylbenzylideneamino)-n-propanol and bromoacetyl chloride for 2-[2-amino-5-chloro-α-(2-chlorophenyl)benzylideneamino]ethanol and bromoacetyl bromide, the desired product melting at 220°~222°C was obtained.

Example 24

7-Nitro-5-phenyl-[5,4-b]-oxazolidino-2,3,4,5-tetrahydro-1H-1,4-benzodiazepin-2-one Following the procedure similar to that described in Example 9, but substituting 2-(2-amino-5-nitro-α-phenylbenzylideneamino)ethanol and bromoacetyl chloride for 2-(2-amino-5-chloro-α-phenylbenzylideneamino)-1-methylethanol and bromoacetyl bromide, the desired product melting at 218°~220°C with decomposition was obtained.

Example 25

7-Chloro-5-(4''-nitrophenyl)-[5,4-b]-5'-methyloxazolidino-2,3,4,5-tetrahydro-1H-1,4-benzodiazepin-2-one Following the procedure similar to that described in Example 11, but substituting 2-[2-amino-5-chloro-α-(4-nitrophenyl) benzylideneamino]-1-methylethanol for 2-[2-amino-5-chloro-α-(2-chlorophenyl)benzylideneamino]ethanol, the desired product melting at 193°~195°C was obtained.

Example 26

7-Chloro-5-(2''-fluorophenyl)-[5,4-b]-oxazolidino-2,3,4,5-tetrahydro-1H-1,4-benzodiazepin-2-one Following the procedure similar to that described in Example 9, but substituting 2-[2-amino-5-chloro-α-(2-fluorophenyl) benzylideneamino]ethanol, triethylamine and bromoacetyl chloride for 2-(2-amino-5-chloro-α-phenylbenzylideneamino)-1-methylethanol, pyridine and bromoacetyl bromide, the desired product melting at 181°~183°C was obtained.

Example 27

7-Chloro-1-phenacyl-5-phenyl-[5,4-b]-5'-methyloxazolidino-2,3,4,5-tetrahydro-1H-1,4-benzodiazepin-2-one Following the procedure similar to that described in Example 11, but substituting 2-(2-phenacylamino-5-chloro-α-phenylbenzyl-ideneamino)-1-methylethanol, potassium carbonate and bromoacetyl chloride for 2-[2-amino-5-chloro-α-(2-chlorophenyl)benzylideneamino]ethanol, sodium carbonate and bromoacetyl bromide, the desired product melting at 175°~176°C was obtained.

Example 28

7-Chloro-1-benzyl-5-phenyl-[5,4-b]-5'-methyloxazolidino-2,3,4,5-tetrahydro-1H-1,4-benzodiazepin-2-one Following the procedure similar to that described in Example 11, but substituting 2-(2-benzylamino-5-chloro-α-phenylbenzylideneamino)-1-methylethanol and bromoacetyl chloride for 2-[2-amino-5-chloro-α-(2-chlorophenyl)benzylideneamino]ethanol and bromoacetyl bromide, the desired product melting at 154°~156°C was obtained.

Example 29

5-Phenyl-[5,4-b]-5'-methyloxazolidino-2,3,4,5-tetrahydro-1H-1,4-benzodiazepin-2-one Following the procedure similar to that described in Example 9, but substituting 2-(2-amino-α-phenylbenzylideneamino)-1-methylethanol for 2-(2-amino-5-chloro-α-phenylbenzylideneamino)-1-methylethanol, the desired product melting at 174°~176°C was obtained.

Exmple 30

7-Chloro-5-phenyl-[5,4-b]-4'-methyloxazolidino-2,3,4,5-tetrahydro-1H-1,4-benzodiazepin-2-one Following the procedure similar to that described in Example 9, but substituting 2-(2-amino-5-chloro-α-phenylbenzylideneamino)-2-methylethanol for 2-(2-amino-5-chloro-α-phenylbenzylideneamino)-1-methylethanol, the desired product melting at 126°~127°C was obtained.

Example 31

7-Chloro-5-phenyl-[5,4-b]-4'-methyloxazolidino-2,3,4,5-tetrahydro-1H-1,4-benzodiazepin-2-one Following the procedure similar to that described in Example 9, but substituting 2-(2-amino-5-chloro-α-phenylbenzylideneamino)-2-methylethanol and tosyloxyacetyl bromide for 2-(2-amino-5-chloro-α- phenylbenzylideneamino)-1-methylethanol and bromoacetyl bromide, the desired product melting at 126°~127°C was obtained.

Example 32

7-Bromo-5-phenyl-[5,4-b]-4'-methyloxazolidino-2,3,4,5-tetrahydro-1H-1,4-benzodiazepin-2-one Following the procedure similar to that described in Example 9, but substituting 2-(2-amino-5-bromo-α-phenylbenzylideneamino)-2-methylethanol for 2-(2-amino-5-chloro-α-phenylbenzylideneamino)-1-methylethanol, the desired product melting at 126°~127°C was obtained.

Example 33

7-Nitro-5-phenyl-[5,4-b]-4'-methyloxazolidino-2,3,4,5-tetrahydro-1H-1,4-benzodiazepin-2-one Following the procedure similar to that described in Example 9, but substituting 2-(2-amino-5-nitro-α- phenylbenzylideneamino)-2-methylethanol for 2-(2-amino-5-chloro-α-phenylbenzylideneamino)-1-methylethanol, the desired product melting at 182°~183°C was obtained.

Example 34

7-Chloro-5-(2''-chlorophenyl)-[5,4-b]-4'-methyloxazolidino-2,3,4,5-tetrahydro-1H-1,4-benzodiazepin-2-one Following the procedure similar to that described in Example 11, but substituting 2-[2-amino-5-chloro-α-(2-chlorophenyl) benzylideneamino]-2-methylethanol for 2-[2-amino-5-chloro-α-(2-chlorophenyl)benzylideneamino] ethanol, the desired product melting at 172°~175°C was obtained.

Example 35

7-Bromo-5-(2''-chlorophenyl)-[5,4-b]-4'-methyloxazolidino-2,3,4,5-tetrahydro-1H-1,4-benzodiazepin-2-one Following the procedure similar to that described in Example 9, but substituting 2-[2-amino-5-bromo-α-(2-chlorophenyl)benzylideneamino]-2-methylethanol for 2-(2-amino-5-chloro-α-phenylbenzylideneamino)-1-methylethanol the desired product melting at 182°~184°C was obtained.

Example 36

9-Methyl-7-chloro-5-phenyl-[5,4-b]-5'-methyloxazolidino-2,3,4,5-tetrahydro-1H-1,4-benzodiazepin-2-one A mixture of 4.4 g of 3-methyl-5-chloro-2-aminobenzophenone and 3.2 g. of isopropanolamine was heated to gentle refluxing for 4 hours. After removal of the excess of isopropanolamine by distillation under reduced pressure, 200 ml of toluene and 3.0 g of pyridine were added to the oily residue predominantly containing 2-(3-methyl-5-chloro-2-aminophenyl)-2-phenyl-5-methyl-oxazolidine. To the resulting solution cooled in ice-water was added 5.8 g of bromoacetyl bromide drop by drop with stirring. The temperature of the reaction mixture was kept below 10°C during the addition of the reagent. The mixture was stirred at ordinary temperature for an additional 3 hours. At the end of this time 200 ml of toluene and 200 ml of water were added and the mixture was shaken. The resulting upper organic layer was separated from other parts, dried over anhydrous sodium sulfate and then the solvent was distilled off. The residue was recrystallized from ethanol to give 2.65 g of the desired product as crystals melting at 250°~253°C.

Exmple 37

7,9-Dimethyl-5-phenyl-[5,4-b]-5'-methyloxazolidino-2,3,4,5-tetrahydro-1H-1,4-benzodiazepin-2-one Following the procedure similar to that described in Example 36, but substituting 3,5-dimethyl-2-aminobenzophenone and bromoacetic anhydride for 3-methyl-5-chloro-2-aminobenzophenone and bromoacetyl bromide, the desired product melting at 271.5°~273°C was obtained.

Example 38

7-Chloro-5-phenyl-[5,4-b]-oxazolidino-2,3,4,5-tetrahydro-1H-14,-benzodiazepin-2-one Following the procedure similar to that described in Example 36, but substituting 5-chloro-2-aminobenzophenone, 2-aminoethanol and triethylamine for 3-methyl-5-chloro-2-aminobenzophenone, isopropanolamine and pyridine, the desired product melting at 175°~176°C was obtained.

Example 39

7-Chloro-5-phenyl-[5,4-b]-5'-methyloxazolidino-2,3,4,5-tetrahydro-1H-1,4-benzodiazepin-2-one Following the procedure similar to that described in Example 36, but substituting 5-chloro-2-aminobenzophenone for 3-methyl-5-chloro-2-aminobenzophenone, the desired product melting at 186.5°~188°C was obtained.

Example 40

7-Bromo-5-phenyl-[5,4-b]-oxazolidino-2,3,4,5-tetrahydro-1H-1,4-benzodiazepin-2-one Following the procedure similar to that described in Example 36, but substituting 5-bromo-2-aminobenzophenone and 2-aminoethanol for 3-methyl-5-chloro-2-aminobenzophenone and isopropanolamine, the desired product melting at 189°~191°C was obtained.

Example 41

7-Bromo-5-phenyl-[5,4-b]-5'-methyloxazolidino-2,3,4,5-tetrahydro-1H-1,4-benzodiazepin-2-one Following the procedure similar to that described in Example 36, but substituting 5-bromo-2-aminobenzophenone and sodium carbonate for 3-methyl-5-chloro-2-aminobenzophenone and pyridine, the desired product melting at 180.5°~182°C was obtained.

Example 42

7-Chloro-5-phenyl-[5,4-b]-tetrahydro-2H-1',3'-oxazino-2,3,4,5-tetrahydro-1H-1,4-benzodiazepin-2-one Following the procedure similar to that described in Example 36, but substituting 5-chloro-2-aminobenzophenone and 3-aminopropanol for 3-methyl-5-chloro-2-aminobenzophenone and isopropanolamine, the desired product melting at 221°~223°C was obtained.

Example 43

7-Nitro-5-phenyl-[5,4-b]-oxazolidino-2,3,4,5-tetrahydro-1H-1,4-benzodiazepin-2-one Following the procedure similar to that described in Example 36, but substituting 5-nitro-2-aminobenzophenone, 2-aminoethanol and triethylamine for 3-methyl-5-chloro-2-aminobenzophenone, isopropanolamine and pyridine, the desired product melting at 217°~221°C with decomposition was obtained.

Example 44

7-Chloro-1-methyl-5-(2''-chlorophenyl)-[5,4-b]-oxazolidino-2,3,4,5-tetrahydro-1H-1,4-benzodiazepin-2-one Following the procedure similar to that described in Example 36, but substituting 5-chloro-2-methylamino-0-chlorobenzophenone and 2-aminoethanol for 3-methyl-5-chloro-2-aminobenzophenone and isopropanolamine, the desired product melting at 156°~158°C was obtained.

Example 45

7-Chloro-1-ethyl-5-phenyl-[5,4-b]-5'-methyloxazolidine-2,3,4,5-tetrahydro-1H-1,4-benzodiazepin-2-one Following the procedure similar to that described in Example 36, but substituting 5-chloro-2-ethylaminobenzophenone and triethylamine for 3-methyl-5-chloro-2-aminobenzophenone and pyridine, the desired product melting at 158°~160°C was obtained.

Example 46

7-Chloro-1-ethyl-5-phenyl-[5,4-b[-5'-methyloxazolidine-2,3,4,5-tetrahydro-1H-1,4-benzodiazepin -2-one Following the procedure similar to that described in Example 36, but substituting 5-chloro-2-ethylaminobenzophenone, triethylamine and tosyloxyacetyl bromide for 3-methyl-5-chloro-2-aminobenzophenone, pyridine and bromoacetyl bromide, the desired product melting at 158°~160°C was obtained.

Example 47

7-Chloro-5-(2''-tolyl)-[5,4-b]-5'-methyloxazolidino-2,3,4,5-tetra-hydro-1H-1,4-benzodiazepin -2-one Following the procedure similar to that described in Example 36, but substituting 5-chloro-2-amino-o-methylbenzophenone for 3-methyl-5-chloro-2-aminobenzophenone, the desired product melting at 203°~205°C with decomposition was obtained.

Example 48

7-Chloro-5-(4''-nitrophenyl)-[5,4-b]-5'-methyloxazolidine-2,3,4,5-tetrahydro-1H-1,4-benzodiazepin-2-one Following the procedure similar to that described in Example 36, but substituting 5-chloro-2-amino-p-nitrobenzophenone and bromoacetyl chloride for 3-metyl-5-chloro-2-amino-benzophenone and bromoacetyl bromide, the desired product melting at 193°~195°C was obtained.

Example 49

7-Chloro-5-(2''-fluorophenyl)-[5,4-b]-5'-methyloxazolidine-2,3,4,5-tetrahydro-1H-1,4-benzodiazepin-2-one Following the procedure similar to that described in Example 36, but substituting 5-chloro-2-amino-o-fluorobenzophenone for 3-methyl-5-chloro-2-aminobenzophenone, the desired product melting at 1-97°~199°C with decomposition was obtained.

Example 50

7-Chloro-5-(2''-fluorophenyl)-[5,4-b]-oxazolidino-2,3,4,5-tetrahydro-1H-1,4-benzodiazepin-2-one Following the procedure similar to that described in Example 36, but substituting 5-chloro-2-amino-o-fluorobenzophenone and 2-aminoethanol for 3-methyl-5-chloro-2-aminobenzophenone and isopropanolamine, the desired product melting at 181°~183°C was obtained.

Example 51

7-Bromo-5-(2''-chlorophenyl)-[5,4-b]-oxazolidino-2,3,4,5-tetrahydro-1H-1,4-benzodiazepine-2-one Following the procedure similar to that described in Example 36, but substituting 5-bromo-2-amino-o-chlorobenzophenone and 2-aminoethanol for 3-methyl-5-chloro-2-aminobenzophenone and isopropanolamine, the desired product melting at 205°~207°C with decomposition was obtained.

Example 52

7-Bromo-5-(2''-chlorophenyl)-[5,4-b]-5'-methyloxazolidino-2,3,4,5-tetrahydro-1H-1,4-benzodiazepine-2-one Following the procedure similar to that described in Example 36, but substituting 5-bromo-2-amino-o-chlorobenzophenone for 3-methyl-5-chloro-2-aminobenzophenone, the desired product melting at 1-96°~198°C with decomposition was obtained.

Example 53

7,8-Dichloro-5-phenyl-[5,4-b]-5'-methyloxazolidino-2,3,4,5-tetrahydro-1H-1,4-benzodiazepine-2-one Following the procedure similar to that described in Example 36, but substituting 4,5-dichloro-2-aminobenzophenone, sodium carbonate and bromoacetyl chloride for 3-methyl-5-chloro-2-aminobenzophenone, pyridine and bromoacetyl bromide, the desired product melting at 196°~197.5°C was obtained.

Example 54

7-Chloro-5-(2''-chlorophenyl)-[5,4-b]-oxazolidino-2,3,4,5-tetrahydro-1H-1,4-benzodiazepine-2-one Following the procedure similar to that described in Example 36, but substituting 5-chloro-2-amino-o-chlorobenzophenone and 2-aminoethanol for 3-methyl-5-chloro-2-aminobenzophenone and isopropanolamine, the desired product melting at 201°~204°C with decomposition was obtained.

Example 55

7-Chloro-5-(2''-chlorophenyl)-[5,4-b]-5'-methyloxazolizino-2,3,4,5-tetrahydro-1H-1,4-benzodiazepine-2-one Following the procedure similar to that described in Example 36, but substituting 5-chloro-2-amino-o-chlorobenzophenone for 3-methyl-5-chloro-2-aminobenzophenone, the desired product melting at 1-90°~192°C with decomposition was obtained.

Example 56

7,9-Dichloro-5-phenyl-[5,4-b]-5'-methyloxazolidino-2,3,4,5-tetrahydro-1H-1,4-benzodiazepine-2-one Following the procedure similar to that described in Example 36, but substituting 3,5-dichloro-2-aminobenzophenone and sodium carbonate for 3-methyl-5-chloro-2-aminobenzophenone and pyridine, the desired product meltng at 226°~228°C was obtained.

Example 57

3,7,9-Trimethyl-5-phenyl-[5,4-b]-oxazolidino-2,3,4,5-tetrahydro-1H-1,4-benzodiazepine-2-one Following the procedure similar to that described in Example 36, but substituting 3,5-dimethyl-2-aminobenzophenone, 2-aminoethanol and α-bromopropionyl chloride for 3-methyl-5-chloro-2-aminobenzo-phenone, isopropanolamine and bromoacetyl bromide, the desired product melting at 218°~221°C was obtained.

Example 58

7-Chloro-3-ethyl-5-phenyl-[5,4,-b]-oxazolidino-2,3,4,5-tetrahydro-1H-1,4-benzodiazepin-2-one Following the procedure similar to that described in Example 36, but substituting 5-chloro-2-aminobenzophenone, 2-aminoethanol and α-bromo-n-butyryl chloride for 3-methyl-5-chloro-2-aminobenzophenone, isopropanolamine and bromoacetyl bromide, the desired product melting at 183°~184°C was obtained.

Example 59

7Chloro-5-phenyl-[5,4-b]-thiazolidone-2,3,4,5-tetrahydro-1H-1,4-benzodiazepin-2-one Following the procedure similar to that described in Example 36, but substituting 5-chloro-2-aminobenzophenone and 2-mercaptoethylamine for 3-methyl-5-chloro-2-aminobenzophenone and isopropanolamine, the desired product melting at 241°~243°C was obtained.

Example 60

7-Chloro-1-benzyl-5-phenyl-[5,4-b]-5'-methyloxazolidine-2,3,4,5-tetrahydro-1H-1,4-benzodiazepin-2-one Following the procedure similar to that described in Example 36, but substituting 5-chloro-2-benzylaminobenzophenone for 3-methyl-5-chloro-2-aminobenzophenone, the desired product melting at 1-54°~157°C was obtained.

Example 61

7-Chloro-1-(p-chlorobenzyl)-5-phenyl-[5,4-b]-5'-methyloxazolidino-2,3,4,5-tetrahydro-1H-1,4-benzodiazepin-2-one Following the procedure similar to that described in Example 36, but substituting 5-chloro-2-(p-chlorobenzyl)aminobenzophenone and triethylamine for 3-methyl-5-chloro-2-aminobenzophenone and pyridine, the desired product melting at 162°~163.5°C was obtained.

Example 62

7-Chloro-5-phenyl-[5,4-b]-4'-methyloxazolidino-2,3,4,5-tetrahydro-1H-1,4-benzodiazepin-2-one Following the procedure similar to that described in Example 36, but substituting 5-chloro-2-aminobenzophenone and 2-amino-n-propanol for 3-methyl-5-chloro-2-aminobenzophenone and isopropanolamine, the desired product melting at 126°~127°C was obtained.

Example 63

7-Chloro-5-phenyl-[5,4-b]-4'-methyloxazolidino-2,3,4,5-tetrahydro-1H-1,4-benzodiazepin-2-one Following the procedure similar to that described in Example 36, but substituting 5-chloro-2-aminobenzophenone, 2-amino-n-propanol and tosyloxyacetyl bromide for 3-methyl-5-chloro-2-aminobenzophenone, isopropanolamine and bromoacetyl bromide, the desired product melting at 126°~127°C was obtained.

Example 64

7-Bromo-5-phenyl-[5,4-b]-4'-methyloxazolidino-2,3,4,5-tetrahydro-1H-1,4-benzodiazepin-2-one Following the procedure similar to that described in Example 36, but substituting 5-bromo-2-aminobenzophenone and 2-amino-n-propanol for 3-methyl-5-chloro-2-aminobenzophenone and isopropanolamine, the desired product melting at 126°~127°C was obtained.

Example 65

7-Nitro-5-phenyl-[5,4-b]-4'-methyloxazolidino-2,3,4,5-tetrahydro-1H-1,4-benzodiazepine-2-one Following the procedure similar to that described in Example 36, but substituting 5-nitro-2-aminobenzophenone and 2-aminopropanol for 3-methyl-5-chloro-2-aminobenzophenone and isopropanolamine, the desired product melting at 182°~183°C was obtained.

Example 66

7-Chloro-5-(2''-chlorophenyl)-[5,4-b]-4'-methyloxazolidino-2,3,4,5-tetrahydro-1H-1,4-benzodiazepine-2-one Following the procedure similar to that described in Example 36, but substituting 5-chloro-2-amino-o-chlorobenzophenone and 2-amino-n-propanol for 3-methyl-5-chloro-2-aminobenzophenone and isopropanolamine, the desired product melting at 172°~175°C was obtained.

Example 67

7-Bromo-5-(2''-chlorophenyl)-[5,4-b]-5'-methyloxazolidino-2,3,4,5-tetrahydro-1H-1,4-benzodiazepine-2-one Following the procedure similar to that described in Example 36, but substituting 5-bromo-2-amino-o-chlorobenzophenone and 2-amino-n-propanol for 3-methyl-5-chloro-2-aminobenzophenone and isopropanolamine, the desired product melting at 182°~184°C was obtained.

Example 68

7-Chloro-5-phenyl-[5,4-b]-oxazolidino-2,3,4,5-tetrahydro-1H-1,4-benzodiazepine-2-one Five point three grams of N-[4-chloro-2-(2'-phenyl-2'-oxazolidinyl) phenyl]carbamoylmethyl-triethylammonium bromide in 40 ml of dimethylformamide was heated under reflux for 24 hours. The solvent was distilled off from the reaction mixture and the residue was extracted with dichloromethane. The dichloromethane extract was washed with water, dried over anhydrous sodium sulfate and then the solvent was distilled off. The residue was recrystallized two times from ethanol to give crystals of the desired product melting at 174°~176°C.

Example 69

7-Chloro-5-phenyl-[5,4-b]-5'-methyloxazoldino-2,3,4,5-tetrahydro-1H-1,4-benzodiazepin-2-one Three point one grams of N-[4-chloro-2-(2'-phenyl-5'-methyl-2'-oxazolidinyl) phenyl] carbamoylmethyl-pyridium bromide was heated at 180°~ 200°C for 1 hour. After completion of the reaction, the reaction mixture was extracted with chloroform. The chloroform extract was washed with water, dried over anhydrous sodium sulfate and then the solvent was distilled off. The residue was recrystallized from ethanol to give crystals of the desired product melting at 186.5° ~ 188°C.

Example 70

7-Nitro-5-phenyl-[5,4-b]-5'-methyloxazolidine-2,3,4,5-tetrahydro-1H-1,4-benzodiazepin-2-one Following the procedure similar to that described in Example 69, but substituting N-[4-nitro-2-(2'-phenyl-5'-methyl-2'-oxazolidinyl) phenyl] carbamoylmethyl-dimethylanilinium bromide for N-[4-chloro-2-(2'-phenyl-5'-methyl-2'-oxazolidinyl)phenyl]carbamoylmethyl- pyridinium bromide, the desired product melting at 208°~209°C was obtained.

Example 71

7-Chloro-5-(2''-fluorophenyl)-[5,4-b]-oxazolidino-2,3,4,5-tetrahydro-1H-1,4-benzodiazepine-2-one Following the procedure similar to that described in Example 68, but substituting N-[4-chloro-2-(2'-o-fluorophenyl-2'-oxazolidinyl) phenyl]carbamoylmethyl-pyridinium bromide and p-cymene for N-[4-chloro-2-(2'-phenyl-2'-oxazolidinyl)phenyl]carbamoylmethyl-triethylammonium bromide and dimethyl formamide, the desired product melting at 181°~183°C was obtained.

Example 72

7-Bromo-5-(2''-chlorophenyl)-[5,4-b]-5'-methyloxazolidino-2,3,4,5-tetrahydro-1H-1,4-benzodiazepine-2-one Following the procedure similar to that described in Example 69, but substituting N-[4-bromo-2-(2'-o-chlorophenyl-5'-methyl-2'-oxazolidinyl)phenyl]carbamoylmethyl-dimethylanilinium bromide for N-[4-chloro-2-(2'-phenyl-5'-methyl-2'-oxazolidinyl)phenyl]carbamoylmethyl-pyridinium bromide, the desired product melting at 196°~198°C with decomposition was obtained.

Example 73

7-Chloro-5-(4''-nitrophenyl)-[5,4-b]-5'-methyloxazolidino-2,3,4,5-tetrahydro-1H-1,4-benzodiazepine-2-one Following the procedure similar to that described in Exmple 69, but substituting N-[4-chloro-2-(2'-p-nitrophenyl-5'-methyl-2'-oxazolidinyl)phenyl]carbamoylmethyl-pyridinium p-toluenesulphonate for N-[4-chloro-2-(2'-phenyl-5'-methyl-2'-oxazolidinyl)phenyl] carbamoylmethyl-prydinium bromide, the desired product melting at 193°~195°C was obtained.

Example 74

7-Chloro-5-(2''-chlorophenyl)-[5,4-b]-oxazolidino-2,3,4,5-tetrahydro-1H-1,4-benzodiazepine-2-one Following the procdure similar to that described in Example 69, but substituting N-[4-chloro-2-(2'-O-chlorophenyl-2'-oxazolidinyl) phenyl]carbamoylmethyl-pyridinium bromide for N-[4-chloro-2-(2'-phenyl-5'-methyl-2'-oxazolidinyl)phenyl]carbamoylmethyl-pyridinium bromide, the desired product melting at 201°~204°C with decomposition was obtained.

Example 75

7-Chloro-5-(2''-chlorophenyl)-[5,4-b]-5'-methyloxazolidinyl-2,3,4,5-tetrahydro-1H-1,4-benzodiazepine-2-one Following the procedure similar to that described in Eample 69, but substituting N-[4-chloro-2-(2'-o-chlorophenyl-5'-methyl-2'-oxazolidinyl)phenyl]carbamoylmethyl-pyridinium bromide for N-[4-chloro-2-(2'-phenyl-5'-methyl-2'-oxazolidinyl)phenyl]carbamoylmethylpyridinium bromide, the desired product melting at 190°~192°C was obtained.

Example 76

7-Chloro-1-methyl-5-(2''-chlorophenyl)-[5,4-b]-oxazolidino-2,3,4,5-tetrahydro-1H-1,4-benzodiazepine-2-one Following the procedure similar to that described in Example 69, but substituting N-[4-chloro-2-(2'-o-chlorophenyl-2'-oxazolidinyl) phenyl]-N-methyl-carbamoylmethyl-dimethylanilinium chloride for N-[4-chloro-2-(2'-phenyl-5'-methyl-2'-oxazolidinyl)phenyl]carbamoylmethyl-pyridinium bromide, the desired product melting at 155°~158°C was obtained.

Example 77

7-Chloro-5-(2''-tolyl)-[5,4-b]-5'-methyloxazolidino-2,3,4,5-tetrahydro-1H-1,4-benzodiazepine-2-one Following the procedure similar to that described in Example 69, but substituting N-[4-chloro-2-(2'-o-tolyl-5'-methyl-2'-oxazolidinyl) phenyl]carbamoylmethyl-pyridinium bromide for N-[4-chloro-2-(2'-phenyl-5'-methyl-2'-oxazolidinyl)phenyl]carbamoylmethyl-pyridinium bromide, the desired product melting at 203°~205°C was obtained.

Example 78

7-Chloro-5-phenyl-[5,4-b]-tetrahydro-2H-1,3-oxazino-2,3,4,5-tetra-hydro-1H-1,4-benzodiazepin-2-one Following the procedure similar to that described in Example 69, but substituting N-[4-chloro-2-(2'-phenyl-2'-tetrahydro-2H-1,3-oxazinyl)phenyl]carbamoylmethyl-pyridinium bromide for N-[4-chloro-2-(2'-phenyl-5'-methyl-2'-oxazolidinyl)phenyl]carbamoylmethyl-pyridinium bromide, the desired product melting at 220.5°~223°C was obtained.

Example 79

7,9-Dimethyl-5-phenyl-[5,4-b]-5'-methyloxazolidino-2,3,4,5-tetrahydro-1H-1,4-benzodiazepin-2-one Following the procddure similar to that described in Example 68, but substituting N-[4,6-dimethyl-2-(2'-phenyl-5'-methyl-2'-oxazolidinyl)phenyl]carbamoylmethyl-pyridinium chloride for N-[4-chloro-2-(2'-phenyl-2'-oxazolidinyl)phenyl]carbamoylmethyl-triethylammonium bromide, the desired product melting at 271°~273°C was obtained.

Example 80

9-Methyl-7-chloro-5-phenyl-[5,4-b]-5'-methyloxazolidino-2,3,4,5-tetrahydro-1H-1,4-benzodiazepin-2-one Following the procedure similar to that described in Example 69, but substituting N-[4-chloro-6-methyl-2-

(2'-phenyl-5'-methyl-2'-oxazolidinyl)phenyl]carbamoylmethyl-dimethylanilinium bromide for N-[4-chloro-2-(2'-phenyl-5'-methyl-2'-oxazolidinyl)phenyl] carbamoylmethyl-pyridinium bromide, the desired product melting at 252°~253°C was obtained.

Example 81

7-Chloro-5-phenyl-[5,4-b]-thiazolidino-2,3,4,5-tetrahydro-1H-1,4-benzodiazepin-2-one Following the procedure similar to that described in Example 69, but substituting N-[4-chloro-2-(2'-phenyl-2'-thiazolidinyl) phenyl]carbamoylmethyl-pyridinium bromide for N-[4-chloro-2-(2'-phenyl-5'-methyl-2'-oxazolidinyl)phenyl]carbamoylmethyl-pyridinium bromide, the desired product melting at 241°~243°C was obtained.

Example 82

7-Chloro-1-ethyl-5-phenyl-[5,4-b]-5'-methyloxazolidino-2,3,4,5-tetrahydro-1H-1,4-benzodiazepin-2-one Following the procedure similar to that described in Example 69, but substituting N-[4-chloro-2-(2'-phenyl-5'-methyl-2'-oxazol-idinyl)phenyl]-N-ethylcarbamoylmethyl-pyridinium chloride for N-[4-chloro-2-(2'-phenyl-5'-methyl-2'-oxazolidinyl)phenyl]carbamoyl-methyl-pyridinium bromide, the desired product melting at 158°~160°C was obtaind.

Example 83

7-Chloro-3-methyl-5-phenyl-[5,4-b]-5'-methyloxazolidino-2,3,4,5-tetrahydro-1H-1,4-benzodiazepin-2-one Following the procedure similar to that described in Example 69, but substituting α-methyl-N-[4-chloro-2-(2'-phenyl-5'-methyl-2'-oxazolidinyl)phenyl]carbamoylmethyl-pyridinium bromide for N-[4-chloro-2-(2'-phenyl-5'-methyl-2'-oxazolidinyl)phenyl]carbamoylmethyl-pyridinium bromide, the desired product melting at 216°~217°C was obtained.

Example 84

7-Chloro-3-ethyl-5-phenyl-[5,4-b]-oxazolidino-2,3,4,5-tetrahydro-1H-1,4-benzodiazepine-2-one Following the procedure similar to that described in Example 69, but substituting α-ethyl-N-[4-chloro-2-(2'-phenyl-2'-oxazolidinyl) phenyl]carbamoylmethyl-pyridinium bromide for N-[4-chloro-2-(2'-phenyl-5'-methyl-2'-oxazolidinyl)phenyl]carbamoylmethyl-pyridinium bromide, the desired product melting at 183°~184°C was obtained.

Example 85

7-Chloro-1-benzyl-5-phenyl-[5,4-b]-5'-methyloxazolidino-2,3,4,5-tetrahydro-1H-1,4-benzodiazepino-2-one Following the procedure similar to that described in Example 69, but substituting N-[4-chloro-2-(2'-phenyl-5'-methyl-2'-oxazolidinyl) phenyl-]-N-benzylcarbamoylmethyl-pyridinium bromide for N-[4-chloro-2-(2'-phenyl-5'-methyl-2'-oxazolidinyl)phenyl]carbamoylmethyl-pyridinium bromide, the desired product melting at 154°~157°C was obtained.

Example 86

7-Chloro-5-phenyl-[5,4-b]-5'-methyloxazolidino-2,3,4,5-tetrahydro-1H-1,4-benzodiazepine-2-one A mixture of 11.8 g of 5-chloro-2aminobenzophenone and 12.0 g of isopropanolamine was heated at 170°~180°C for 4 hours. After removal of the excess isopropanolamine by distillation under reduced pressure, 150 ml of dioxane and 8.0 g of pyridine were added to the resulting oily residue predominantly containing 2-(5-chloro-2-aminophenyl)-2-phenyl-5-methyloxazolidine. To the resulting solution cooled in an ice-water bath was added 12.2 g of bromoacetyl bromide drop by drop with stirring. During the addition of the reagent, the temperature of the reaction mixture was kept below 20°C. The mixture was stirred at room temperature for additional 3hours. At the end of this time 300 ml of toluene and 250 ml of water were added and then the mixture was shaken and stood. The mixture separated to three layers, i.e., the upper organic layer, lower aqueous layer and precipitated oily layer. The upper organic layer separated therefrom was dried over anhydrous sodium sulfate and then the solvent was distilled off. The residue was recrystallized from the ethanol to give the desired product melting at 186.5°~188°C.

The oily layer separated from the reaction mixture was washed with a small amount of toluene and of water, added ethanol to give micro-crystalline substances. After filtering, washing with ethanol and drying, there were obtained micro-crystals of N-[4-chloro-2-(2'-phenyl-5'-methyl-2'-oxazolidinyl)phenyl]carbamoylmethyl-pyridinium bromide.

Three point one grams of said pyridinium salt was heated at 180°~200°C for about 1 hour. After completion of the reaction, the reaction mixture was extracted with chloroform. The chloroform extract was washed with water, dried over anhydrous sodium sulfate and then the solvent was distilled off. The residue was recrystalized from ethanol to give the desired product.

Example 87

7-Chloro-5-(2''-chlorophenyl)-[5,4-b]-5'-methyloxazolidino-2,3,4,5-tetrahydro-1H-1,4-benzodiazepin-2-one Following the procedure similar to that described in Example 86, but substituting 5-chloro-2-amino-o-chlorobenzophenone for 5-chloro-2-aminobenzophenone, the pyridinium salt, i.e. N-[4-chloro-2-(2'-O-chlorophenyl-5'-methyl-2'-oxazolidinyl)phenyl]carbamoylmethylpyridinium bromide, and the desired product melting at 190°~192°C was obtained.

Example 88

7-Chloro-1-ethyl-5-phenyl-[5,4-b]-5'-methyloxazolidino-2,3,4,5-tetrahydro-1H-1,4-benzodiazepin-2-one Following the procedure similar to that describd in Example 86, but substituting 5-chloro-2-ethylaminobenzophenone and tri-ethylamine for 5-chloro-2-aminobenzophenone and pyridine, the quaternary ammonium salt, i.e. N-[4-chloro-2-(2'-phenyl-5'-methyl-2'-oxazolidinyl)phenyl]-N-ethylcarbamoylmethyl-triethylammonium bromide and the desired product melting at 158°-160°C was obtained.

Example 89

7-Chloro-5-phenyl-[5,4-b]-oxazolidino-2,3,4,5-tetrahydro-1H-1,4-benzodiazepin-2-one Following the procedure similar to that described in Example 86, but substituting 2-aminoethanol and triethylamine for isopropanolamine and pyridine, the quaternary ammonium salt, i.e. N-[4-chloro-2-(2'-phenyl-2'-oxazolidinyl)phenyl]carbamoylmethyl-triethylammonium bromide, and the desired product melting at 174 ~176°C was obtained.

Example 90

7-Chloro-3-ethyl-5-phenyl-[5,4-b]-oxazolidino-2,3,4,5-tetrahydro-1H-1,4-benzodiazepin-2one Following the procedure similar to that described in Example 86, but substituting 2-aminoethanol and α-bromo-n-butyryl chloride for isopropanolamine and bromoacetyl bromide, the pyridinium salt, i.e. α-ethyl-N-[4-chloro-2-(2'-phenyl-2'-oxazolidinyl)phenyl]carbamoylmethyl-pyridinium bromide, and the desired product melting at 183°~184°C was obtained.

What is claimed is:

1. A process for the preparation of a compound having the formula (I)

wherein
$R_1$, $R_2$ and $R_3$ may be the same or different and each represents:
hydrogen atom,
a lower alkyl group,
a lower alkoxy group,
a halogen atom,
nitro group,
cyano group,
an acyl group selected from the group consisting of lower alkanoyl, benzoyl, toluoyl and naphthoyl groups,
trifluoromethyl group,
amino group,
an acylamino group selected from the group consisting of lower alkanoylamino, benzoylamino, toluoylamino and naphthoylamino groups,
a N-mono(lower alkyl)amino group,
a N-di(lower alkyl)amino group,
an acyloxy group selected from the group consisting of lower alkanoyloxy and benzoyloxy groups,
carboxyl groups,
a lower alkoxycarbonyl group,
carbamoyl group,
a N-mono(lower alkyl)carbamoyl group,
a N-di(lower alkyl)carbamoyl group,
a lower alkylthio group,
a lower alkylsulfinyl group or
a lower alkylsulfonyl group;

$R_4$ represents
hydrogen atom,
a lower alkyl group,
a lower cycloalkyl group,
a phenyl or naphthyl group,
benzyl or phenethyl group,
chlorbenzyl group or
phenacyl group;

$R_5$ represents
hydrogen atom or
a lower alkyl group;

A represents an alkylene group having from 2 to 4 carbon and which may be straight or branched; and Y represents an oxygen atom or a sulfur atom which comprises reacting a compound having the formula (II) or (II)'

(II)            (II)' wherein $R_1$, $R_2$, $R_3$, $R_4$, Y and A are as defined above or a mixture of these compounds with a halogenide or anhydride of a carboxylic acid having the formula $$HOOC-CH-Q$$
$$\quad\quad\quad |$$
$$\quad\quad\quad R_5 \quad\quad\quad (III)$$

wherein Q represents an acid radical of a hydrohalogenic acid ester, a sulfonic acid ester or a phosphoric acid ester and $R_5$ is as defined above in the presence of an inert organic solvent.

2. A process for the preparation of a compound having the formula (I)

(I)

wherein
$R_1$, $R_2$ and $R_3$ may be the same or different and each represents
hydrogen atom,
a lower alkyl group,
a lower alkoxy group,
a halogen atom,
a nitro group,
cyano group,
an acyl group selected from the group consisting of lower alkanoyl, benzoyl, toluoyl and naphtoyl groups,
trifluoromethyl group,
amino group, an acylamino group selected from the group consisting of lower alkanoylamino, benzoyl-amino and naphthoylamino groups,
a N-mono(lower alkyl)amino group,
a N-di(lower alkyl)amino group,
an acyloxy group selected from the group consisting of lower alkanoyloxy and benzoyloxy groups,
carboxyl groups,
a lower alkoxycarbonyl group,
carbamoyl group,
a N-mono(lower alkyl) carbamoyl group,
a N-di(lower alkyl) carbamoyl group,
a lower alkylthio group,
a lower alkylsulfinyl group or
a lower alkylsulfonyl group;

$R_4$ represents
a hydrogen atom,
a lower alkyl group,
a lower cycloalkyl group,
a phenyl or naphthyl group,
benzyl or phenethyl group,
chlorbenzyl group or
phenacyl group;

$R_5$ represents
hydrogen atom or
a lower alkyl group;

A represents
an alkylene group having from 2 to 4 carbon atoms and which may be straight or branched; and Y represents an oxygen atom or a sulfur atom which comprises reacting a compound having the formula (II) or (II)'

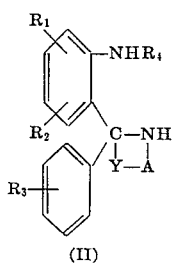 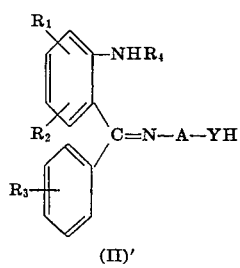

(II) (II)' wherein $R_1$, $R_2$, $R_3$, $R_4$, Y and A are as defined above or a mixture of these compounds with a halogenide or anhydride of a carboxylic acid having the formula

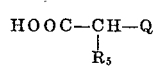

(III)

wherein Q represents an acid radical or a hydrohalogenic acid ester, a sulfonic acid ester or a phosphoric acid ester and $R_5$ is as defined above in the presence of a tertiary amine selected from the group consisting of trimethylamine, triethylamine, dimethylaniline, diethyl-aniline and pyridine to produce a mixture of compounds of the formulae (I) and (IV) or (IV)'

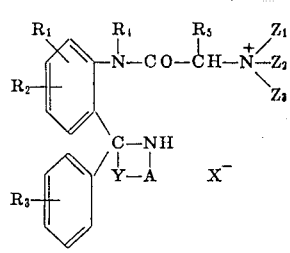

(IV)

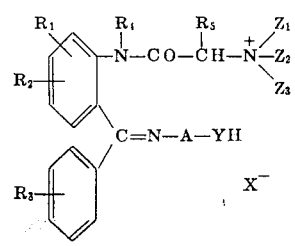

(IV)' wherein $R_1$, $R_2$, $R_3$, $R_4$, $R_5$, Y and A are as defined above, the group

represents a quaternary ammonium ion selected from the group consting of trimethylammonium, triethylammonium, dimethylanilinium, diethylanilinium and pyridinium and $X^-$ represents an anion selected from the group consisting of chloride, bromide, sulfate, acetate, picrate, benzoate and p-toluenesulfonate, separating the compound having the formula (IV) or (IV)' from the compound having the formula (I) and heating the compound having the formula (IV) or (IV)' thus obtained at a temperature in the neighborhood of the melting point or decomposition point of said compound having the formula (IV) or (IV)'.

3. Process for the preparation of a compound having the formula (I)

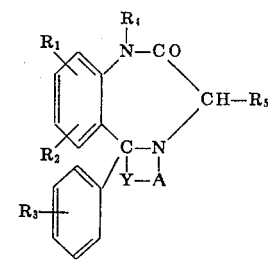

(I)

wherein
$R_1$, $R_2$ and $R_3$ may be the same or different and each represents
hydrogen atom,
a lower alkyl group,
a lower alkoxy group,
a halogen atom,
nitro group,
cyano group,
an acyl group selected from the group consist-ing of lower alkanoyl, benzoyl, toluoyl and naphthoyl groups,
trifluoromethyl group,
amino group,
an acylamino group selected from the group consistng of lower alkanoylamino, benzoylamino, toluoylamino and naphthoylamino groups,
a N-mono(lower alkyl)amino group,
a N-di(lower alkyl)amino group,
an acyloxy group selected from the group consisting of lower alkanoyloxy and benzoyloxy groups,
carboxyl group,
a lower alkoxycarbonyl group,
carbamoyl group,
a N-mono(lower alkyl)carbamoyl group,
a N-di(lower alkyl) carbamoyl group,
a lower alkythio group, a lower alkylsulfinyl group or
a lower alkylsulfonyl group;
$R_4$ represents
hydrogen atom,
a lower alkyl group,
a lower cycloalkyl group,
a phenyl or naphthyl group,
benzyl or phenethyl group,
chlorbenzyl group or phenacyl group;
$R_5$ represents
hydrogen atom or
a lower alkyl group;
A represents an alkylene group having from 2 to 4 carbon atoms and which may be straight or branched; and
Y represents an oxygen atom or a sulfur atom which comprises heating a compound having the formula (IV) or (IV)'

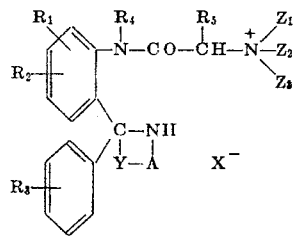

(IV)

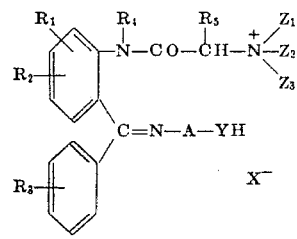

(IV)' wherein $\overline{R}_1$, $R_2$, $R_3$, $R_4$, $R_5$, Y and A are as defined above, the group

represents a quaternary ammonium ion selected from the group consisting of trimethylammonium, triethylammonium, dimethylanilinium, diethylanilinium and pyridinium, and $X^-$ represents an anion selected from the group consisting of chloride, bromide, sulfate, acetate, picrate, benzoate and p-toluenesulfonate, at a temperature in the neighborhood of the melting point or decomposition point of said compound having the formula (IV) or (IV)'.

4. The process of claim 1 wherein reaction is conducted in the presence of an acid binding agent.

* * * * *